Figure 1:
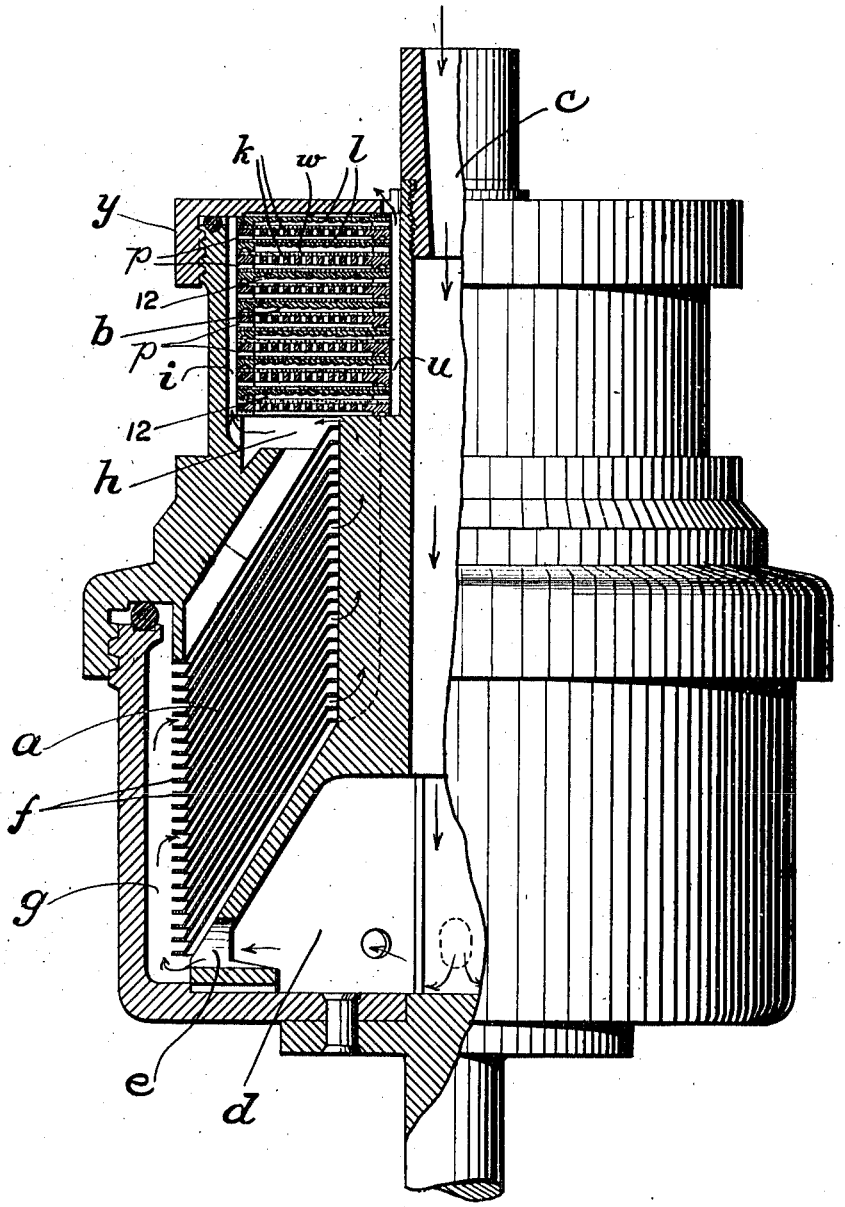

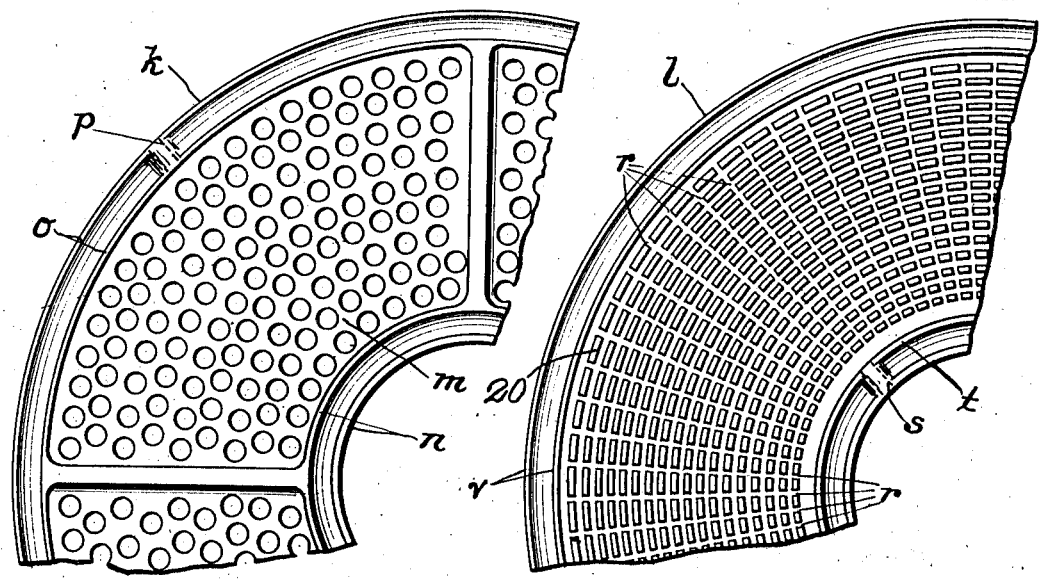
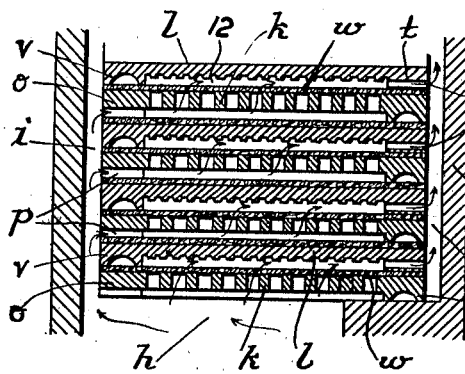
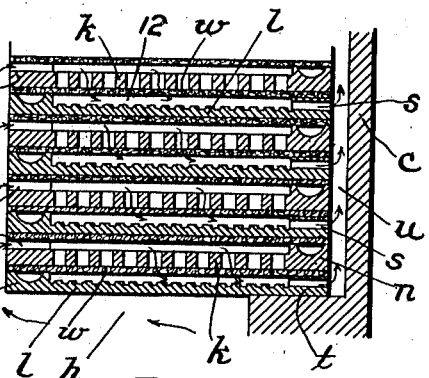
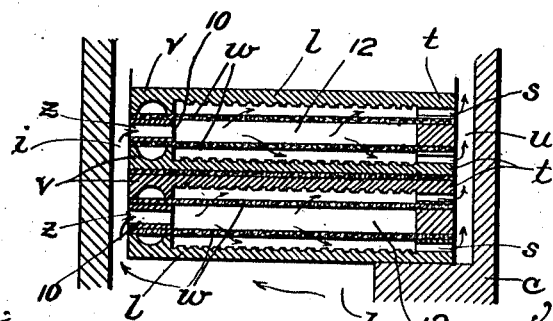

T. B. MARSHALL.
CENTRIFUGAL CLARIFIER AND FILTER.
APPLICATION FILED APR. 2, 1909.

955,890.

Patented Apr. 26, 1910.

UNITED STATES PATENT OFFICE.

THOMAS B. MARSHALL, OF POUGHKEEPSIE, NEW YORK, ASSIGNOR TO THE DE LAVAL SEPARATOR COMPANY, A CORPORATION OF NEW JERSEY.

CENTRIFUGAL CLARIFIER AND FILTER.

955,890.  Specification of Letters Patent.  Patented Apr. 26, 1910.

Application filed April 2, 1909. Serial No. 487,478.

*To all whom it may concern:*

Be it known that I, THOMAS B. MARSHALL, a subject of the King of Great Britain, residing at Poughkeepsie, county of Dutchess, and State of New York, have invented a new and useful Improvement in Centrifugal Clarifiers and Filters, of which the following is a full, clear, and exact description, reference being had to the accompanying drawings, which form a part of this specification.

My invention is intended to be used to clarify such liquids as varnishes and allied products, oils, fruit syrups and extracts, in fact all liquids containing a sediment deposit even of the finest stock.

Speaking generally, I provide a preliminary clarification by centrifugal force in a rapidly rotated compartment. This compartment may be, and in most cases preferably is, provided with inclined plates dividing the liquid under action into thin laminæ or strata, so that the preliminary clarifying is more completely carried on. The sediment collects at and adjacent to the periphery of this compartment and when the space left for it is filled up, the machine is stopped and the sediment removed. If the liquid contains excessive quantities of sediment, the length of the plates may be reduced to have a greater space at the periphery, or the plates entirely removed, or a rough preliminary separation may take place in a separate bowl without liners. The liquid near the center of this compartment, and thus largely free from sediment, is led by an appropriate passage to the filtering compartment. This filtering compartment is connected so as to revolve with the first mentioned compartment. It is provided with a plurality of superimposed horizontal filtering sections forming separator filtering chambers, the liquid is led into each of these chambers from a channel or passage near the outer surface of the filtering compartment, and passes vertically upwardly or downwardly, or in both directions, through the filtering material, and is then led from each chamber to discharge passages near the center of rotation of the compartment. By this construction and arrangement of the filtering compartment, the action which causes the liquid to move vertically through the filtering material is slight and therefore full time for filtering action is given. The discharge being near the center there is no danger of any sediment being carried along with the liquid. The arrangement of the filtering material and the chambers causes the centrifugal force of the rotation of the compartment to force the sediment toward the periphery of the compartment and thus keep the filtering material free from sediment and in its most active condition.

In general, my invention consists in a two compartment bowl, in one compartment preliminary clarification takes place by the action of centrifugal force, the partially clarified liquid is then led to a filtering compartment rotating with the first compartment, where it passes vertically through filtering material, and is led to the discharge passage near the center of the compartment. In less general terms, it involves in the filtering compartment, a series of chambers containing filtering material into which chambers the partially clarified liquid is distributed near the outer part of the compartment and passes vertically through the filtering material, and is led from each chamber to discharge passages near the center of the compartment.

I will now describe the embodiment of my invention as illustrated in the accompanying drawings, and then point out the invention in the claims.

Figure 7:
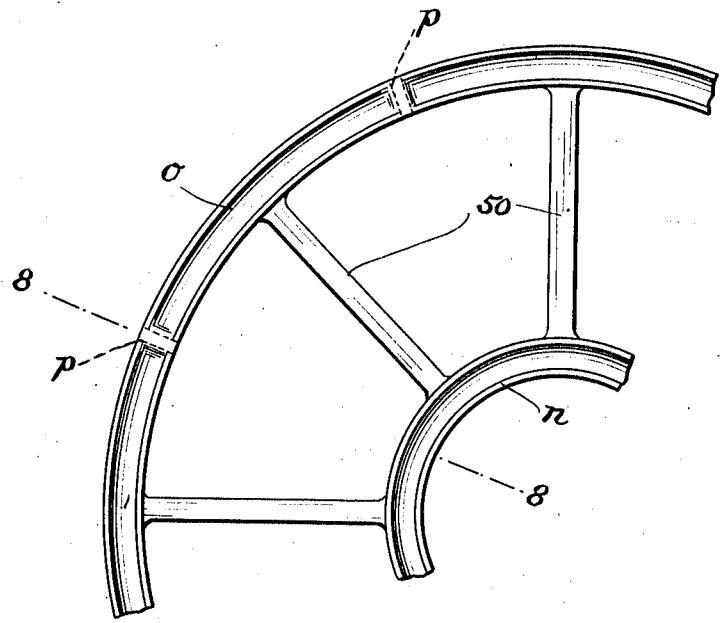
Figure 8:
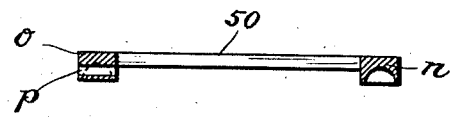

In the drawings: Figure 1 is a sectional view of an aparatus embodying my invention. Fig. 2 is an enlarged detail view showing a part of the face of the perforated filtering disks. Fig. 3 is a similar detail view of the other filtering disk. Fig. 4 is an enlarged section through a portion of the filtering chamber showing one arrangement of the disks. Figs. 5 and 6 are similar views showing other arrangement of the disks. Fig. 7 is an enlarged detail view showing a part of another form of non-solid filtering disk. Fig. 8 is a section on the line 8—8, Fig. 7.

*a* and *b* represent the two compartments of a rotatable bowl.

*c* is the inlet tube or tubular shaft through which the liquid to be treated enters the chamber, *d* is the lower portion of the compartment *a*. The outer wall of this compartment has the orifices *e*.

In the compartment *a* are the inclined plates *f*. These plates *f* do not extend to the periphery of the compartment *a*, there being the space passage or chamber $g$ between their outer ends and the periphery of the compartment, in which the sediment may collect, and when filled the apparatus is stopped and the sediment removed.

The liquid to be treated enters through inlet tube or pipe $c$ to the chamber $d$. By centrifugal force, the liquid is forced out through the orifices $e$ to the chamber $g$ from which it is distributed between the plates $f$. The heaviest sediment will settle in the chamber $g$ before the liquid enters between the plates $f$. Under the action of centrifugal force upon the liquid in the spaces between the plates $f$, the heavier and solid particles will be forced against the under side of the upper plate of the pair of plates and forced outward on said side or face of the plate to the chamber $g$. The purified or partially purified liquid will be forced inward along the upper face of the lower plate and upward into the passage or chamber $h$ in the filtering compartment $b$. The filtering compartment $b$ has the horizontal passage or chamber $h$ and the vertical passage or chamber $i$, the latter at the periphery of the compartment. In this compartment is a multiple filter or a plurality of filtering chambers 12. Each filtering chamber is formed by the disks $k$ and $l$ and the interposed filtering material $w$. The disk $k$ is provided with the central non-solid portion $m$, which, as shown in Figs. 1 to 6, is perforated, to allow the liquid to pass freely therethrough, and the inner ridge or raised portion $n$ and the outer ridge or raised portion $o$. The inner raised portion $n$ is solid throughout, while the outer ridge or raised portion is pierced with the orifices $p$. The disk $l$ is provided with the raised portions 20 forming between said portions the channels $r$. These channels radiate toward the central portion of the compartment and open into the openings $s$ in the central ridge or raised portion $t$ which opens into the vertical passage $u$. The outer ridge $v$ of this disk $l$ is solid. Between these disks is placed filtering material, such, for instance, as filtering paper. The raised portions 20 of the disk $l$ also prevents the filtering material seating on the surface of said disk $l$. Any number of these filtering chambers may be provided, dependent upon the size of the filtering compartment. The partially clarified liquid passes directly from the passage $h$ into the lowest filtering chamber. After passing through the filtering material, it follows the channels in the disk $l$ to the orifices $s$ into the passages $u$. The liquid is distributed into the other filtering chambers from the passage or chamber $i$ through the respective orifices $p$. The orifices $p$ enable an even distribution to be made of the liquid in the chambers. After entering the chamber, it passes vertically through the filtering material and to the channels in the lower surface of plate $l$ by which it is led to the openings $s$ through which it passes to the vertical passages $u$. The centrifugal action forces the liquid through the orifices in plate $k$ and through the filtering material at the same time, the movement being vertical, the force is not sufficient to cause it to move through the filtering material too rapidly. The discharge of the liquid from the filtering chambers is at a point where there is no tendency for it to carry with it any sediment which may pass through the filter. The whole tendency of the centrifugal force being not only to prevent this carrying with it of sediment but to positively drive any solid matter to the passage or channel $i$, and thus in addition frees the filtering material from sediment.

In Figs. 7 and 8, I have shown another form of non-solid disk $k$. In this case, the disk is a skeleton disk formed with an inner ridge or raised portion $n$ and outer ridge or raised portion $o$ similar to that shown in Fig. 2. The outer ridge has an opening $p$. These ridges or raised portions, however, unlike the disk shown in Fig. 2, are not connected by a perforated portion or plate, but are connected by spokes 50, thus forming an open space between the outer and inner ridges through which the liquid passes to the filtering material.

While I have thus far described a construction for this filtering chamber in which the liquid moved upward through the filtering material, the disks can be reversed as shown in Fig. 5, in which case the liquid will pass downwardly through the filtering chamber. I can also, as shown in Fig. 6, use a construction in which the liquid in each filtering chamber can pass in both directions, thus making each filtering chamber a duplex chamber.

The filtering sections and the disks after being assembled are held in proper relation to each other by the cover $y$. The orifices or openings $p$ enable proper division of the liquid between all of the filtering chambers. If the operation be carried on properly, there is little danger of the passage or chamber $i$ being filled with solid matter for a long time as the clarification in the compartment $a$ will leave but little sediment to be removed in compartment $b$.

While the operation of this machine is not entirely continuous, by properly constructing the compartment $a$, it can be run for a long time without the passage or chamber $g$ filling. Thus for instance, by reducing the length of the plates $f$, the passage or chamber $g$ may be made larger if the liquid treated contains a high percentage of sediment. Indeed if the amount of sediment be very great, the plates may be removed entirely. It is, however, better to use the plates if possible, even if it be necessary to make a preliminary clarification in an open bowl, as the plates dividing the liquid into thin laminæ or strata make more complete the clarification in compartment *a* than would be possible without their use.

In the construction of Fig. 6 I do not use the perforated or non-solid plates but use two sets of filtering material *w*, each backed up by a solid disk *l*, as in the case of the other construction; the two sets of filtering material being separated by the ring 10 to form the filtering chamber 12. These rings have the inlet orifices *z* in connection with passage or chamber *i*.

When I use the terms vertical or vertically and horizontal and horizontally, I am referring to the relation with the axis of the bowl. Thus, horizontal or horizontally refers to a condition not parallel with the axis of the bowl; and vertical or vertically to a condition parallel, or substantially parallel with the axis of the bowl. This is done in order to explain clearly that the apparatus shown may revolve in the position, as shown in the drawings, or at an angle to that position.

Having now fully described my invention, what I claim and desire to protect by Letters Patent is:

1. A centrifugal clarifier and filter, comprising in combination a two compartment rotatable bowl, one compartment being devoid of filtering material, layer or layers of filtering material in the other compartment, an inlet passage to the first compartment, and a passage from the first compartment to the second compartment in communication vertically with the filtering material.

2. A centrifugal clarifier and filter, comprising in combination a two compartment rotatable bowl, one compartment being devoid of filtering material, layer or layers of filtering material in the second copramtment, an inlet passage leading to the outer portion of the first mentioned compartment, a passage from the inner portion of said compartment to the other compartment in communication vertically with the filtering material.

3. A centrifugal clarifier and filter, comprising in combination a two compartment rotatable bowl, one compartment being devoid of filtering material, layer or layers of filtering material in the second compartment, an inlet passage leading to the outer portion of the first mentioned compartment, a passage from the inner portion of said compartment to the outer portion of the second compartment, there being an inlet in communication vertically with one side of the filtering material from the outer portion of the second compartment, and an outlet from the other side of the filtering material to the inner portion of said second compartment.

4. A centrifugal clarifier and filter, comprising in combination a two compartment rotatable bowl, one compartment being devoid of filtering material, layer or layers of filtering material in the other compartment, an inlet passage to the first compartment, and a passage from the first compartment to the second compartment, there being an inlet in the second compartment in communication vertically with one side of the filtering material, and an outlet from the other side of said filtering material.

5. A centrifugal clarifier and filter, comprising in combination a two compartment rotatable bowl, one compartment being devoid of filtering material, a passage in the outer portion of said compartment, filtering chamber or chambers in the other compartment, each chamber having filtering material, a passage at the outer portion of said filtering chamber compartment, a passage connecting the first compartment and the passage in the outer portion of the filtering chamber compartment, there being an opening from said last mentioned passage to the filtering chamber in communication vertically with one side of the filtering material, and an outlet at the inner portion of the chamber on the opposite side of the filtering material.

6. A centrifugal clarifier and filter, comprising in combination, a two compartment rotatable bowl, superimposed inclined plates extending from near the periphery to near the inner end of the first compartment, said compartment being devoid of filtering material, layer or layers of filtering material in the other compartment, an inlet passage to the first compartment, and a passage from the first compartment to the second compartment in communication vertically with the filtering material.

7. A centrifugal clarifier and filter, comprising in combination, a two compartment rotatable bowl, superimposed inclined plates extending from near the periphery to near the inner end of the first compartment, said compartment being devoid of filtering material, horizontal layer or layers of filtering material in the other compartment, an inlet passage to the first compartment, and a passage from the first compartment to the second compartment, there being an inlet in the second compartment to one horizontal side of the filtering material, and an outlet from the other side of said filtering material.

8. A centrifugal clarifier and filter, comprising in combination a two compartment rotatable bowl, one compartment being devoid of filtering material, superimposed inclined plates extending from near the periphery to near the inner end of said first compartment, layer or layers of filtering material in the second compartment, an inlet passage leading to the outer portion of the first mentioned compartment, a passage from the inner portion of said compartment to the other compartment in communication vertically with the filtering material.

9. A centrifugal clarifier and filter, comprising in combination a two compartment rotatable bowl, one compartment being devoid of filtering material, superimposed inclined plates extending from near the periphery to near the inner end of said first compartment, horizontal layer or layers of filtering material in the second compartment, an inlet passage leading to the outer portion of the first mentioned compartment, a passage from the inner portion of said compartment to the other compartment, there being an inlet to one horizontal side of the filtering material from the outer portion of the second compartment, and an outlet from the other side of the filtering material to the inner portion of said second compartment.

10. In an apparatus of the character described, in combination, a rotating compartment, filtering material extending horizontally in said compartment from a point near the outer portion to a point near the inner portion of said compartment, an inlet to one portion of the compartment to one horizontal side of the filtering material, and an outlet from the opposite side of said filtering material to the portion of the compartment opposite to that of the inlet.

11. In an apparatus of the character described, in combination a rotating compartment, filtering material extending horizontally in said compartment from a point near the outer portion to a point near the inner portion of said compartment, an inlet or inlets from the outer portion of the compartment to one horizontal side of the filtering material, and an outlet from the other side of said filtering material to the inner portion of the compartment.

12. In an apparatus of the character described, in combination a rotating compartment, a plurality of layers of filtering material in said compartment, there being a passage between the outer ends of said filtering layers and the periphery of the compartment, there also being a passage between the inner end of said compartment and said filtering layers, an inlet or inlets from the outer passage to one side of each filtering layer, and an outlet from the opposite side of the filtering layer to the inner passage.

13. In an apparatus of the character described, in combination a rotating compartment, a plurality of horizontal filtering chambers in said compartment, a horizontal layer of filtering material in each of said chambers, dividing said chambers, there being a passage between said chambers and the periphery of the compartment, and a passage between said chambers and the inner end of said compartment, there being an inlet or inlets from the outer passage to each chamber on one side of said filtering material, and an outlet from each chamber, on the opposite side of the filtering material to the inner passage.

14. In an apparatus of the character described, in combination a rotating compartment, a horizontal disk, adapted to allow the liquid to pass therethrough, and a horizontal solid disk in said compartment, filtering material between said disks, an inlet or inlets to one horizontal side of the filtering material, and an outlet from the other side of the filtering material.

15. In an apparatus of the character described, in combination a rotating compartment, a horizontal disk, adapted to allow the liquid to pass therethrough, and a horizontal solid disk in said compartment, filtering material between said disks, an inlet or inlets to one side of the filtering material, and an outlet from the other side of the filtering material, there being a passage between the disks and the periphery of the compartment communicating with the said inlet or inlets, and a passage between the inner portion of the compartment and the disks communicating with said outlet or outlets.

16. In an apparatus of the character described, in combination a rotating compartment, a plurality of filtering chambers in said compartment, each chamber having a horizontal disk, adapted to allow the liquid to pass therethrough, and a solid horizontal disk, and filtering material between said disks, an inlet or inlets to each chamber on one side of the filtering material, and an outlet from each chamber on the other side of said filtering material.

17. In an apparatus of the character described, in combination a rotating compartment, a plurality of filtering chambers in said compartment, each chamber having a horizontal disk, adapted to allow the liquid to pass therethrough, and a solid horizontal disk, and filtering material between said disks, an inlet or inlets to each chamber on one side of the filtering material, and an outlet from each chamber on the other side of said filtering material, there being a passage between the disks and the periphery of the compartment communicating with the said inlet or inlets, and a passage between the inner portion of the compartment and the disks communicating with said outlet or outlets.

18. In an apparatus of the character described, in combination a rotating compartment, a horizontal disk, adapted to allow the liquid to pass therethrough, and a horizontal solid grooved disk in said compartment, filtering material between said disks, an inlet or inlets to one side of the filtering material, and an outlet from the other side of the filtering material.

19. In an apparatus of the character described, in combination a rotating compartment, a horizontal disk, adapted to allow the liquid to pass therethrough, and a horizontal solid grooved disk in said compartment, filtering material between said disks, an inlet or inlets to one side of the filtering material, and an outlet from the other side of the filtering material, there being a passage between the disks and the periphery of the compartment communicating with the said inlet or inlets, and a passage between the inner portion of the compartment and the disks communicating with said outlet or outlets.

20. In an apparatus of the character described, in combination a rotating compartment, a plurality of filtering chambers in said compartment, each chamber having a perforated disk adapted to allow the liquid to pass therethrough, and a solid horizontal grooved disk, and filtering material between said disks, an inlet or inlets to each chamber on one side of the filtering material, and an outlet from each chamber on the other side of said filtering material.

21. In an apparatus of the character described, in combination a rotating compartment, a plurality of filtering chambers in said compartment, each chamber having a perforated disk, adapted to allow the liquid to pass therethrough, and a solid horizontal grooved disk, and filtering material between said disks, an inlet or inlets to each chamber on one side of the filtering material, and an outlet from each chamber on the other side of said filtering material, there being a passage between the disks and the periphery of the compartment communicating with the said inlet or inlets, and a passage between the inner portion of the compartment and the disks communicating with said outlet or outlets.

22. In an apparatus of the character described, in combination a rotating compartment, a horizontal disk, adapted to allow the liquid to pass therethrough, said disk having a ledge, a solid horizontal disk having a ledge, filtering material between said disks, an inlet orifice or orifices in the ledge of the first mentioned disk, and an outlet orifice or orifices in the ledge of the solid disk.

23. In an apparatus of the character described, in combination a rotating compartment, a horizontal disk, adapted to allow the liquid to pass therethrough, said disk having a ledge, a solid grooved horizontal disk having a ledge, filtering material between said disks, an inlet orifice or orifices in the ledge of the first mentioned disk, and an outlet orifice or orifices in the ledge of the solid disk.

24. In an apparatus of the character described, in combination a rotating compartment, a horizontal disk, adapted to allow the liquid to pass therethrough, said disk having a ledge, a solid horizontal disk having a ledge, filtering material between said disks, an inlet orifice or orifices in the ledge of the first mentioned disk, and an outlet orifice or orifices in the ledge of the solid disk, there being a passage between the disks and the periphery of the compartment communicating with the said inlet or inlets, and a passage between the inner portion of the compartment and the disks communicating with said outlet or outlets.

25. In an apparatus of the character described, in combination a rotating compartment, a horizontal disk, adapted to allow the liquid to pass therethrough, said disk having a ledge, a solid grooved horizontal disk having a ledge, filtering material between said disks, an inlet orifice or orifices in the ledge of the first mentioned disk, and an outlet orifice or orifices in the ledge of the solid disk, there being a passage between the disks and the periphery of the compartment communicating with the said inlet or inlets, and a passage between the inner portion of the compartment and the disks communicating with said outlet or outlets.

26. In an apparatus of the character described, in combination a rotating compartment, a plurality of filtering chambers in said compartment, each chamber having a horizontal disk, adapted to allow the liquid to pass therethrough, and a solid horizontal disk, and filtering material between said disks, each disk having a ledge, an inlet orifice or orifices, in the ledge of the first mentioned disk, and an outlet or outlets in the ledge of the solid disk.

27. In an apparatus of the character described, in combination a rotating compartment, a plurality of filtering chambers in said compartment, each chamber having a horizontal disk, adapted to allow the liquid to pass therethrough, and a solid grooved horizontal disk, and filtering material between said disks, each disk having a ledge, an inlet orifice or orifices in the ledge of the first-mentioned disk, and an outlet or outlets in the ledge of the solid disk.

In testimony of which invention, I have hereunto set my hand, at New York, on this 27th day of March, 1909.

THOMAS B. MARSHALL.

Witnesses:
 RALPH STODDARD,
 ROBERT H. HEEP.